United States Patent Office 3,505,303
Patented Apr. 7, 1970

3,505,303
WATER SOLUBLE MODIFIED POLYVINYL ALCOHOL FILMS
Martin K. Lindemann, Somerville, N.J., assignor, by mesne assignments, to Air Reduction Company, Incorporated, New York, N.Y., a corporation of New York
No Drawing. Filed Dec. 30, 1966, Ser. No. 605,980
Int. Cl. C08f 3/34
U.S. Cl. 260—91.3                     3 Claims

ABSTRACT OF THE DISCLOSURE

A cold-water-soluble film is provided which comprises an acrylamide-modified polyvinyl alcohol, most suitably containing 0.4 to 6 mole percent acrylamide.

---

This invention relates to new and useful water-soluble film materials. More specifically this invention relates to a modified polyvinyl alcohol which forms clear, colorless films. These films are readily soluble in cold water, have adequate tensile and tear strength characteristics and retain their water solubility and mechanical strength characteristics even when stored under high temperature and high relative humidity conditions.

Water-soluble films and wrappers have been widely used for packaging soaps, detergents, bleaches, insecticides and a variety of other materials. Any of these materials wrapped in packages made of these films may be dissolved or dispersed in water by simply depositing the entire package therein. The wrapper or film material rapidly disintegrates with moderate agitation and dissolves completely thereby releasing the packaged material.

Vinyl acetate is well known to form a polymer. When polyvinyl acetate is partially hydrolyzed it yields what may be termed a copolymer of vinyl acetate and vinyl alcohol, which is conventionally referred to as partially-hydrolyzed polyvinyl alcohol. It is also known that upon substantially complete hydrolysis of polyvinyl acetate one obtains polyvinyl alcohol which disperses in water because of the great number of hydroxyl groups per macromolecule. When cast into films, however, polyvinyl alcohols, even when prepared by complete hydrolysis of polyvinyl acetate, do not disperse in cold water in the manner necessary for detergent packaging.

Many techniques have been investigated to modify polyvinyl alcohol to increase the water solubility of films cast therefrom. For example, it has been found that by copolymerizing vinyl acetate with certain other monomers, hydrolysis of the resultant copolymers is sufficient to yield film forming products which may be readily dispersed in water. In view of the development of cold-water detergents, the demand for packaging materials which are soluble in cold water has increased very substantially.

It is, therefore, an object of this invention to provide new and useful film materials which are particularly characterized by ready solubility in cold water.

It is a further object of this invention to provide new and useful film materials which readily dissolve in cold water and have high tensile strength and heat sealing characteristics making them particularly suitable for use in detergent packaging and related arts.

It is also the object of this invention to modify polyvinyl alcohol to convert it into clear film forming materials which are readily soluble in cold water and possess high tensile and tear strength.

These and other objects will appear more clearly from the detailed specification which follows.

In accordance with the present invention it has now been found that polyvinyl alcohol of at least 80% hydrolysis, which is commercially obtained by the partial or complete hydrolysis of polyvinyl acetate, can be modified by the addition of acrylamide in the presence of highly basic reagents such as the alkali metal hydroxides, preferably sodium hydroxide or potassium hydroxide.

The polyvinyl alcohol subjected to treatment according to this invention is a commercial product, available in various degrees of hydrolysis, and its preparation forms no part of the invention. Typical commercial products are sold by the Air Reduction Company, Incorporated under the trade name "Vinol," and by E. I. Du Pont de Nemours and Company under the trade name "Elvanol." A commercial method for producing polyvinyl alcohol is disclosed for example in Kominami U.S. Patent No. 3,278,-505. Especially suitable for use in the process of the present invention is polyvinyl alcohol which has an extremely high degree of hydrolysis. Such materials are known in the art as "superhydrolyzed" polyvinyl alcohol resin of fully hydrolyzed polyvinyl alcohol resin. The super grade may have a degree of hydrolysis of 99.7 percent or higher, and the fully hydrolyzed grade may have a percent hydrolysis of 99+ percent or higher. Such material is sold under a variety of trade names. Among the commercially available super-hydrolyzed grades may be mentioned Vinol 125 produced by Air Reduction Company, Incorporated. Among examples of fully hydrolyzed polyvinyl alcohol having a percent hydrolysis of 99+ percent may be mentioned Vinol 260, Vinol 230 and Vinol 205, produced by Air Reduction Company, Incorporated. Other polyvinyl alcohols having a percent hydrolysis between about 97 percent and 98 percent and sold under the trade names Vinol 350 and Vinol 355 by the same company are also especially suitable.

In accordance with the present invention the polyvinyl alcohol of at least 80% hydrolysis, i.e., containing 0 to 20 mole percent of polyvinyl acetate, is reacted with acrylamide. The reaction may conveniently be effected by dissolving the polyvinyl alcohol in water at temperatures of about 50 to 100° C. forming a solution containing about 5 to 30% solids. The alkali metal hydroxide is then added to the solution either as an aqueous solution or as a solid. From about 2 to about 10 weight percent, based on the polyvinyl alcohol, of sodium hydroxide will effect the desired reaction of the acrylamide with the polyvinyl alcohol. The acrylamide is then added to the polyvinyl alcohol solution, whereupon the reaction mixture is maintained at a temperature of from about 50 to 90° C. for a period of time sufficient to achieve the desired substitution, usually from about ½ hour to about 3 hours. The acrylamide adds to the polyvinyl alcohol as follows:

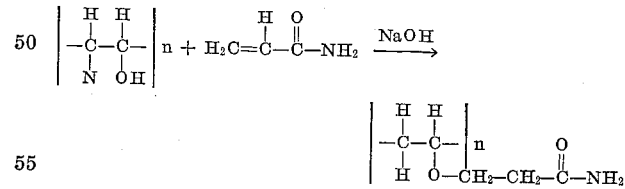

The amount of acrylamide added may vary from about 0.08 to 1 mole per vinyl alcohol unit mole in the polymer. The amount of acrylamide should be correlated with the reaction conditions to produce modified polyvinyl alcohols containing from 0.4 to 6.0 mole percent acrylamide. Accordingly the preferred final modified polyvinyl alcohols contain from 0.4 to 6.0, preferably about 2.0 to 2.5 mole percent acrylamide, from 0 to 20 mole percent polyvinyl acetate and the remainder polyvinyl alcohol.

The following examples are illustrative of the present invention.

EXAMPLE I 33.0 g. of a medium viscosity polyvinyl alcohol (99.7 percent hydrolyzed) was added to 281.0 g. of agitated distilled water at about 50–60° C. Heating was continued to 95° C. whereupon the polyvinyl alcohol soon dissolved to give a clear solution. An aqueous solution of sodium hydroxide (1.0 g. in 10.0 g. water) was added to the polyvinyl alcohol solution and the temperature allowed to fall to 75–80° C., whereupon 6.0 g. of dry acrylamide were added and the mixture maintained at this temperature for 0.75 hour. The reaction mixture was diluted with water, precipitated in methanol, filtered and dried in a vacuum oven at 45° C.

Aqueous solutions containing 10 percent of the modified polyvinyl alcohol were prepared and films were cast therefrom on glass plates. Control films were also cast from the unmodified polyvinyl alcohol used. The films were dried overnight in a conditioned room at 72° F. and 50 percent R.H. Approximately half of the films prepared were stored in several airtight jars containing activated alumina. A minimum of 48 hours conditioning at both 0 and 50 percent R.H. was maintained for all films tested.

A Mullen Tester was used to determine the burst strength of the films conditioned at 0 and 50 percent R.H.

The comparative cold water solubility of the films prepared was determined as follows: A one-inch-square sample of each film was dropped into 300 cc. of nonagitated water at 23° C. The time required for the film to lose its dimensional stability and to disintegrate was recorded.

Analysis of the modified polyvinyl alcohol showed the nitrogen content to be 0.12 percent or 0.42 mole percent acrylamide.

The burst strength of the control films and the acrylamide modified polyvinyl alcohol films were substantially the same. However, the control films did not disintegrate in cold water while the films prepared from the acrylamide-modified polyvinyl alcohol all disintegrated in cold water in four minutes or less.

EXAMPLE II

The same procedure as in Example I was followed except that 2.5 grams of sodium hydroxide were used and the reaction time was increased to 2.0 hours. The cast films prepared therefrom readily disintegrated in cold water.

EXAMPLE III

The same procedure as in Example I was followed except that 7.0 grams acrylamide were used and the reaction time was extended to 1.5 hours. The modified polyvinyl alcohol analyzed 0.15 percent nitrogen or 0.47 mole percent acrylamide. Cast films were made therefrom were found to be soluble in cold water.

EXAMPLE IV

The same procedure as in Example I was followed except that 30 grams of the polyvinyl alcohol, 2.5 grams of sodium hydroxide and 58 grams of acrylamide were used and the reaction time was increased to 1.0 hours. The modified polyvinyl alcohol contained 1.7 percent nitrogen or 5.86 mole percent acrylamide. Cast films made from this product was readily soluble in cold water.

EXAMPLE V 99 grams of a medium viscosity polyvinyl alcohol (99.7 percent hydrolyzed) was charged into 869 grams distilled water at 60° C. The temperature was raised to 100° C. and maintained at that level until complete dissolution occurred. The solution was allowed to cool and 3.9 grams of sodium hydroxide pellets were added. When the temperature had again reached 75° C. 18 grams of acrylamide was added and the reaction mixture was maintained at this temperature. After 45 minutes a portion (Sample A) of the reaction mixture was removed. Another portion (Sample B) of the reaction mixture was maintained at the reaction temperature for an additional 1½ hours. Each portion was diluted with water and precipitated in methanol. However, methanol produced a milk-white colloidal solution which failed to settle. The addition of small amounts of acetone caused agglomeration and rapid settlement. The agglomerated Samples A and B were filtered, dried, analyzed, cast into films and tested as in Example I. The results are summarized in the following table.

TABLE

| Sample | Percent N | Mole Percent Acrylamide | Solubility[1] | Burst Strength[2] | |
|---|---|---|---|---|---|
| | | | | 50% R.H. and 76° F. | 0% R.H. and 76° F. |
| Control | | | Did not dis | 29.2 | 38.0 |
| A | 0.63 | 2.17 | 4.0 | 33.5 | 38.5 |
| B | 0.71 | 2.45 | ¾ to 1.0 | 29.8 | 38.8 |

[1] Time in minutes for disintegration of film in non-agitated water at about 23° C.
[2] Average figure, in lbs., as determined with Mullen Tester.

As may be seen from the above data the acrylamide-modified polyvinyl alcohol films have slightly higher burst strengths than the unmodified polyvinyl alcohol films when conditioned at 50% relative humidity. Both modified and unmodified films had comparable burst strengths when conditioned at 0% relative humidity. A slight increase in burst strength of films conditioned at 50% R.H. occurs as the content of acrylamide is increased. Only the acrylamide-modified polyvinyl alcohol films had the desired cold water solubility characteristics.

While films made from the acrylamide-modified polyvinyl alcohols have good cold water solubility and mechanical properties, these films may be further improved by the addition of suitable plasticizers thereto prior to the formation of the films. Various well-known polyvinyl alcohol plasticizers may be employed such as glycerol, diethylene glycol, triethylene glycol, triethanolamine, 1,3-butane-diol, Carbowax-200 and the like.

Variations and modifications of the invention will be apparent to one skilled in the art in view of the foregoing disclosure, and it is intended to include within the invention all such modifications and variatons except as do not come within the scope of the appended claims.

I claim:
1. A cold-water-soluble film comprising a polyvinyl alcohol of at least 80% hydrolysis modified with 0.4 to 6.0 mole percent of acrylamide, said modification occuring between the hydroxy group of the polyvinyl alcohol and the beta-position of the acrylamide.
2. A film as defined in claim 1, in which the amount of acrylamide is between 2.0 and 2.5 mole percent.
3. A film as defined in claim 1, containing a plasticizer for the acrylamide-modified polyvinyl alcohol.

References Cited

UNITED STATES PATENTS 3,338,883   8/1967   Tesoro et al.

OTHER REFERENCES

De Bell et al.: German Plastics Practice, published by The Murray Printing Co., Cambridge, Mass. (1946) p. 103.

HARRY WONG, Jr., Primary Examiner

U.S. Cl. X.R.

260—29.6

UNITED STATES PATENT OFFICE
CERTIFICATE OF CORRECTION

Patent No. 3,505,303　　　　　　　Dated April 7, 1970

Inventor(s) Martin K. Lindemann

It is certified that error appears in the above-identified patent and that said Letters Patent are hereby corrected as shown below:

Col. 2, line 51, "N" should read -- H --.

Col. 4, line 13, add the word -- at -- after "Burst Strength$^2$";
　　　　line 28, "in-" should read -- de- --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents